D. C. TAYLOR.
TIRE ARMOR.
APPLICATION FILED JAN. 29, 1917.

1,250,710.

Patented Dec. 18, 1917.

WITNESSES
John M. Dobie
S. M. McColl

INVENTOR
Denman C. Taylor

BY Richard Owen
ATTORNEY

UNITED STATES PATENT OFFICE.

DENMAN C. TAYLOR, OF MILLER, NEBRASKA.

TIRE-ARMOR.

1,250,710.

Specification of Letters Patent.  Patented Dec. 18, 1917.

Application filed January 29, 1917. Serial No. 145,263.

*To all whom it may concern:*

Be it known that I, DENMAN C. TAYLOR, a citizen of the United States, residing at Miller, in the county of Buffalo and State of Nebraska, have invented certain new and useful Improvements in Tire-Armors, of which the following is a specification.

This invention relates to improvements in armors or protectors for pneumatic tires.

The object of the invention is to provide a simply constructed light outer tire covering or armor which will effectively prevent blowouts and diminish the liability of punctures, also serving to prolong the life of the tire.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
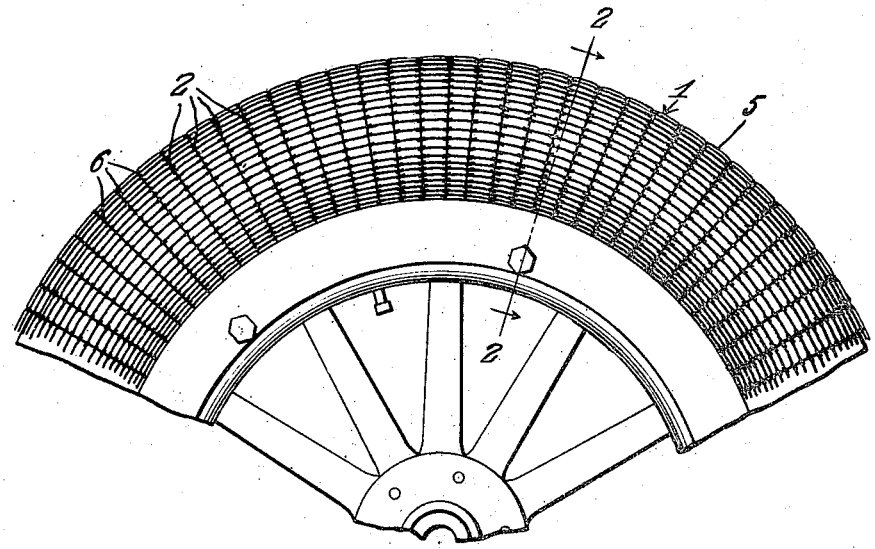
Figure 1 represents a side elevation of a portion of a wheel equipped with this improved armor.
Figure 2:
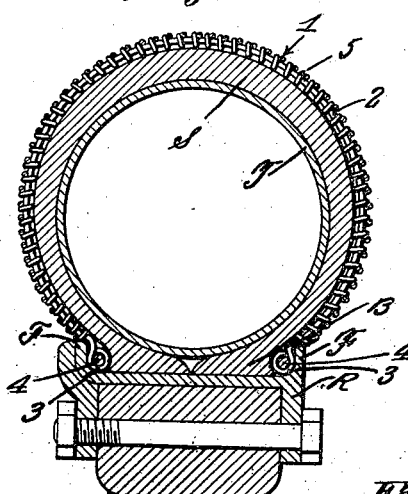
Fig. 2 is a transverse vertical section taken on the line 2—2 of Fig. 1.
Figure 4:
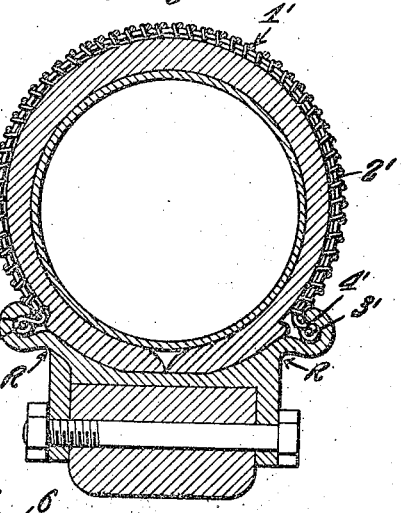
Fig. 4 is a transverse vertical section showing a slightly different form of the invention.

This improved tire armor is shown in Figs. 1 and 2 applied to a wheel having a rim with straight walled flanges, while in Fig. 4 it is shown applied to a rim of the clencher type.

In Figs. 1 and 2, an inner tube T is shown of the usual construction incased within an outer shoe S also of ordinary construction and which is mounted on the rim R having straight walled flanges F between which and the bead B on the shoe S, the edges of the tire armor are clamped.

The armor 1 constituting this invention is composed of a plurality of longitudinally spaced cross wires 2 which are disposed any suitable or desired distance apart and are of a length sufficient to extend transversely around the shoe S to which the armor is to be applied. These cross wires 2 are all of the same length and are provided at their terminals with eyes 3 formed by bending said terminals inward as shown in Fig. 2. Reinforcing and attaching wires 4 are shown threaded through the eyes 3 and serve to connect the wires and also form an attaching bead for engagement by the rim flanges, as is shown clearly in Fig. 2.

Figure 3:
Fig. 3 is an enlarged detailed plan view of a portion of the tire armor.

Longitudinally or circumferentially extending wires 5 are interlaced with the cross wires 2, being shown provided with loops or coils 6 spaced apart the distance it is desired to space the cross wires and through which said cross wires pass, as is shown clearly in Fig. 3. The formation of the loops or coils 6 in the longitudinally or peripherally extending wires 5 form obliquely disposed connecting links 7 between the cross wires, so that when the armor is applied to a tire, these links will engage the surface over which the wheel passes at an angle and thereby adapt them to operate as anti-skidding devices.

The longitudinal circumferentially extending wires 5 may be arranged as close together as is practical to prevent the entrance between them of articles which would be liable to puncture the tire and by arranging them in close relation all possibility of a blowout of the tire is prevented.

In Fig. 4 the armor 1' is constructed exactly as that above described, except that the eyes 3' formed at the ends of the cross wires 2' are bent laterally outward to form beads adapted to enter in the curved flanges of a clencher rim to facilitate the engagement of the armor by said rim.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

A tire protector composed of a plurality of transversely extending longitudinally spaced wires and a plurality of continuous longitudinally extending wires having longitudinally spaced coils formed therein through which said transverse wires extend forming obliquely disposed connecting links between said transverse wires, and attaching means connected to the ends of said transverse wires.

In testimony whereof I affix my signature in presence of two witnesses.

DENMAN C. TAYLOR.

Witnesses:
 Ross Brown,
 John G. King.

Copies of this patent may be obtained for five cents each, by addressing the "Commissioner of Patents, Washington, D. C."